United States Patent
Johnson et al.

(10) Patent No.: US 12,291,997 B1
(45) Date of Patent: May 6, 2025

(54) VARIABLE AREA TURBINE NOZZLE ASSEMBLY

(71) Applicant: General Electric Company, Schenectady, NY (US)

(72) Inventors: Steven Douglas Johnson, Milford, OH (US); Scott Alan Schimmels, Miamisburg, OH (US); Craig Alan Gonyou, Blanchester, OH (US); Paul Hadley Vitt, Liberty Township, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/650,626

(22) Filed: Apr. 30, 2024

(51) Int. Cl.
    *F02C 7/042* (2006.01)

(52) U.S. Cl.
    CPC .......... *F02C 7/042* (2013.01); *F05D 2260/50* (2013.01); *F05D 2270/303* (2013.01)

(58) Field of Classification Search
    CPC ................. F02C 7/042; F05D 2260/50; F05D 2270/303; F01D 17/16; F01D 17/162; F01D 17/167; F01D 5/146; F04D 29/563
See application file for complete search history.

(56) References Cited

U.S. PATENT DOCUMENTS

| | | |
|---|---|---|
| 2,582,842 A | 1/1952 | Messinger |
| 2,787,440 A | 4/1957 | Thompson, Jr. |
| 3,220,697 A | 11/1965 | Smuland et al. |
| 3,420,502 A | 1/1969 | Howald |
| 3,584,458 A | 6/1971 | Wetzler |
| 3,736,069 A | 5/1973 | Beam, Jr. et al. |
| 3,814,313 A | 6/1974 | Beam, Jr. et al. |
| 3,895,243 A | 7/1975 | Amend et al. |
| 4,023,731 A | 5/1977 | Patterson |
| 4,296,599 A | 10/1981 | Adamson |
| 4,505,124 A | 3/1985 | Mayer |
| 4,550,573 A | 11/1985 | Rannenberg |
| 4,613,280 A | 9/1986 | Tate |
| 4,619,580 A | 10/1986 | Snyder |
| 4,730,982 A | 3/1988 | Kervistin |

(Continued)

FOREIGN PATENT DOCUMENTS

| | | |
|---|---|---|
| DE | 961742 C | 4/1957 |
| EP | 2388436 A2 | 11/2011 |

(Continued)

*Primary Examiner* — Steven M Sutherland
(74) *Attorney, Agent, or Firm* — Dority & Manning, P.A.

(57) ABSTRACT

A variable area turbine nozzle assembly includes a guide vane including an outer centering pin defining a tab. An inner support ring is spaced radially outward from the guide vane and defines an opening and a protrusion. The protrusion is configured to engage with the tab of the outer centering pin. An outer support ring extends circumferentially around the inner support ring and defines an aperture. The outer support ring has a second coefficient of thermal expansion that is greater than or less than the first coefficient of thermal expansion. At least one linkage joins the inner support ring to the outer support ring and is configured to rotate the inner support ring circumferentially about an axial centerline of the variable area turbine nozzle assembly in response to a change in operational temperature of a combustion gas thus causing the guide vane to rotate.

19 Claims, 8 Drawing Sheets

(56) References Cited

U.S. PATENT DOCUMENTS

| | | | |
|---|---|---|---|
| 4,773,212 A | 9/1988 | Griffin et al. | |
| 4,805,398 A | 2/1989 | Jourdain et al. | |
| 5,149,018 A | 9/1992 | Clark | |
| 5,207,558 A | 5/1993 | Hagle et al. | |
| 5,245,821 A | 9/1993 | Thomas, Jr. et al. | |
| 5,316,437 A | 5/1994 | Czachor | |
| 5,341,636 A | 8/1994 | Paul | |
| 5,667,168 A | 9/1997 | Fluegel | |
| 5,672,047 A * | 9/1997 | Birkholz | F01D 9/065 415/161 |
| 5,722,241 A | 3/1998 | Huber | |
| 5,724,806 A | 3/1998 | Homer | |
| 5,931,636 A | 8/1999 | Savage et al. | |
| 5,941,537 A | 8/1999 | Wallace et al. | |
| 6,050,079 A | 4/2000 | Durgin et al. | |
| 6,106,229 A | 8/2000 | Nikkanen et al. | |
| 6,116,852 A | 9/2000 | Pierre et al. | |
| 6,126,390 A | 10/2000 | Bock | |
| 6,182,435 B1 | 2/2001 | Niggemann et al. | |
| 6,250,097 B1 | 6/2001 | Lui et al. | |
| 6,415,595 B1 | 7/2002 | Wilmot, Jr. et al. | |
| 6,435,454 B1 | 8/2002 | Engelhardt | |
| 6,485,255 B1 | 11/2002 | Care et al. | |
| 6,672,072 B1 | 1/2004 | Giffin, III | |
| 6,701,717 B2 | 3/2004 | Flatman et al. | |
| 7,118,322 B2 | 10/2006 | Mortgat | |
| 7,260,926 B2 | 8/2007 | Sabatino et al. | |
| 7,377,098 B2 | 5/2008 | Walker et al. | |
| 7,395,657 B2 | 7/2008 | Johnson | |
| 7,398,641 B2 | 7/2008 | Stretton et al. | |
| 7,445,424 B1 | 11/2008 | Ebert et al. | |
| 7,553,126 B2 | 6/2009 | Charier et al. | |
| 7,836,680 B2 | 11/2010 | Schwarz et al. | |
| 7,882,704 B2 | 2/2011 | Chen | |
| 7,966,807 B2 | 6/2011 | Norris et al. | |
| 7,987,676 B2 | 8/2011 | Ast et al. | |
| 8,043,045 B2 | 10/2011 | Clark et al. | |
| 8,056,345 B2 | 11/2011 | Norris et al. | |
| 8,177,884 B2 | 5/2012 | Schmidt et al. | |
| 8,261,528 B2 | 9/2012 | Chillar et al. | |
| 8,499,822 B2 | 8/2013 | Bulin et al. | |
| 8,522,572 B2 | 9/2013 | Coffinberry et al. | |
| 8,561,386 B2 | 10/2013 | Mons | |
| 8,656,722 B2 | 2/2014 | Norris et al. | |
| 8,678,753 B2 | 3/2014 | Farrell | |
| 8,684,275 B2 | 4/2014 | Vafai et al. | |
| 8,747,055 B2 | 6/2014 | McCune et al. | |
| 8,757,508 B2 | 6/2014 | Haasz et al. | |
| 8,765,070 B2 | 7/2014 | Norton et al. | |
| 8,789,377 B1 | 7/2014 | Brostmeyer | |
| 8,858,161 B1 | 10/2014 | Ryznic et al. | |
| 8,944,367 B2 | 2/2015 | Bystry, Jr. et al. | |
| 8,978,353 B2 | 3/2015 | Norton et al. | |
| 8,984,884 B2 | 3/2015 | Xu et al. | |
| 8,991,191 B2 | 3/2015 | Diaz et al. | |
| 9,014,791 B2 | 4/2015 | Held | |
| 9,038,397 B2 | 5/2015 | Papa et al. | |
| 9,120,580 B2 | 9/2015 | Sampath | |
| 9,127,566 B2 | 9/2015 | Suciu et al. | |
| 9,175,566 B2 | 11/2015 | Xu et al. | |
| 9,181,933 B2 | 11/2015 | Daly et al. | |
| 9,188,010 B2 | 11/2015 | Jha et al. | |
| 9,200,855 B2 | 12/2015 | Kington et al. | |
| 9,267,382 B2 | 2/2016 | Szwedowicz et al. | |
| 9,297,310 B2 | 3/2016 | Giri et al. | |
| 9,347,334 B2 | 5/2016 | Joe et al. | |
| 9,410,482 B2 | 8/2016 | Krautheim et al. | |
| 9,458,764 B2 | 10/2016 | Alecu et al. | |
| 9,567,095 B2 | 2/2017 | McCarthy et al. | |
| 9,580,185 B2 | 2/2017 | Rhoden et al. | |
| 9,593,590 B2 | 3/2017 | Ebert et al. | |
| 9,644,490 B2 | 5/2017 | Joe et al. | |
| 9,797,310 B2 | 10/2017 | Ekanayake et al. | |
| 9,845,692 B2 | 12/2017 | Jamison | |
| 10,018,064 B2 | 7/2018 | Wilber et al. | |
| 10,113,486 B2 | 10/2018 | Mueller et al. | |
| 10,233,841 B2 | 3/2019 | Bintz et al. | |
| 10,287,983 B2 | 5/2019 | Schmitx | |
| 10,337,343 B2 | 7/2019 | Miranda et al. | |
| 10,619,504 B2 | 4/2020 | Tyler et al. | |
| 10,760,426 B2 | 9/2020 | Vitt et al. | |
| 10,787,920 B2 | 9/2020 | Day et al. | |
| 10,815,802 B2 | 10/2020 | Prasad | |
| 10,907,546 B2 | 2/2021 | Schmitz | |
| 10,920,612 B2 | 2/2021 | Lefebvre et al. | |
| 10,934,868 B2 | 3/2021 | Thomas et al. | |
| 11,268,699 B2 | 3/2022 | Bourgois et al. | |
| 11,692,448 B1 | 7/2023 | Vitt et al. | |
| 2009/0016871 A1 | 1/2009 | McCaffrey | |
| 2009/0067978 A1 | 3/2009 | Suljak, Jr. | |
| 2009/0133380 A1 | 5/2009 | Donnerhack | |
| 2009/0162192 A1 * | 6/2009 | McCaffrey | F01D 17/162 415/160 |
| 2009/0188234 A1 | 7/2009 | Suciu et al. | |
| 2009/0196737 A1 | 8/2009 | Mitchell | |
| 2010/0212857 A1 | 8/2010 | Bulin et al. | |
| 2010/0288376 A1 | 11/2010 | Haasz et al. | |
| 2010/0313591 A1 | 12/2010 | Lents et al. | |
| 2011/0167831 A1 | 7/2011 | Johnson | |
| 2012/0216502 A1 | 8/2012 | Freund et al. | |
| 2013/0186100 A1 | 7/2013 | Rhoden et al. | |
| 2013/0192238 A1 | 8/2013 | Munsell et al. | |
| 2013/0259687 A1 | 10/2013 | Suciu et al. | |
| 2013/0280028 A1 | 10/2013 | Benjamin et al. | |
| 2014/0165570 A1 | 6/2014 | Herring | |
| 2014/0205446 A1 | 7/2014 | Patsouris et al. | |
| 2014/0271115 A1 | 9/2014 | Duge et al. | |
| 2014/0345292 A1 | 11/2014 | Diaz et al. | |
| 2014/0360153 A1 | 12/2014 | Papa et al. | |
| 2015/0000291 A1 | 1/2015 | Smith et al. | |
| 2015/0040986 A1 | 2/2015 | Tichborne et al. | |
| 2015/0114611 A1 | 4/2015 | Morris et al. | |
| 2016/0108814 A1 | 4/2016 | Schmitz | |
| 2016/0138478 A1 | 5/2016 | Negulescu | |
| 2016/0215646 A1 | 7/2016 | Gonyou et al. | |
| 2016/0290214 A1 | 10/2016 | Ekanayake et al. | |
| 2016/0341126 A1 | 11/2016 | Kupratis et al. | |
| 2016/0369700 A1 | 12/2016 | Ribarov et al. | |
| 2017/0030266 A1 | 2/2017 | Cerny et al. | |
| 2017/0044984 A1 | 2/2017 | Pesyna et al. | |
| 2017/0114721 A1 | 4/2017 | Miller et al. | |
| 2017/0159566 A1 | 6/2017 | Sennoun et al. | |
| 2017/0167382 A1 | 6/2017 | Miller et al. | |
| 2017/0184027 A1 | 6/2017 | Moniz et al. | |
| 2018/0354637 A1 | 12/2018 | Suciu et al. | |
| 2019/0063313 A1 | 2/2019 | Rez et al. | |
| 2019/0153952 A1 | 5/2019 | Niergarth et al. | |
| 2019/0153953 A1 | 5/2019 | Niergarth et al. | |
| 2019/0186296 A1 | 6/2019 | Orkiszewski | |
| 2019/0218971 A1 | 7/2019 | Niergarth et al. | |
| 2020/0199051 A1 | 6/2020 | Ohhigashi et al. | |
| 2021/0199051 A1 | 7/2021 | Gonyou et al. | |

FOREIGN PATENT DOCUMENTS

| | | |
|---|---|---|
| GB | 2034822 A | 6/1980 |
| GB | 2136880 A | 9/1984 |
| GB | 2204361 A | 11/1988 |
| JP | S5932893 U | 2/1984 |
| WO | WO02/038938 A1 | 5/2002 |
| WO | WO2006/079438 A1 | 8/2006 |

* cited by examiner

VARIABLE AREA TURBINE NOZZLE ASSEMBLY

FIELD

The present disclosure relates to a gas turbine engine. More particularly, this disclosure is directed to a variable area turbine nozzle assembly for a gas turbine engine.

BACKGROUND

In the design of gas turbine engines, fluid flow through the engine is varied by a plurality of stator vanes and rotor blades. Typically, static nozzle segments direct flow of a working fluid into stages of turbine blades connected to a rotating rotor. Each nozzle has an airfoil or vane shape configured such that when a set of nozzles are positioned about a rotor of the turbine, they direct the gas flow against the rotor blades. Directional and pressure requirements may vary with changes in operating conditions including temperature, engine mass flow, and so forth. Static vanes may not provide the most efficient direction and pressure gas flow over a full range of operating conditions, resulting in decreased efficiency. Variable vanes enhance flow direction and pressure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
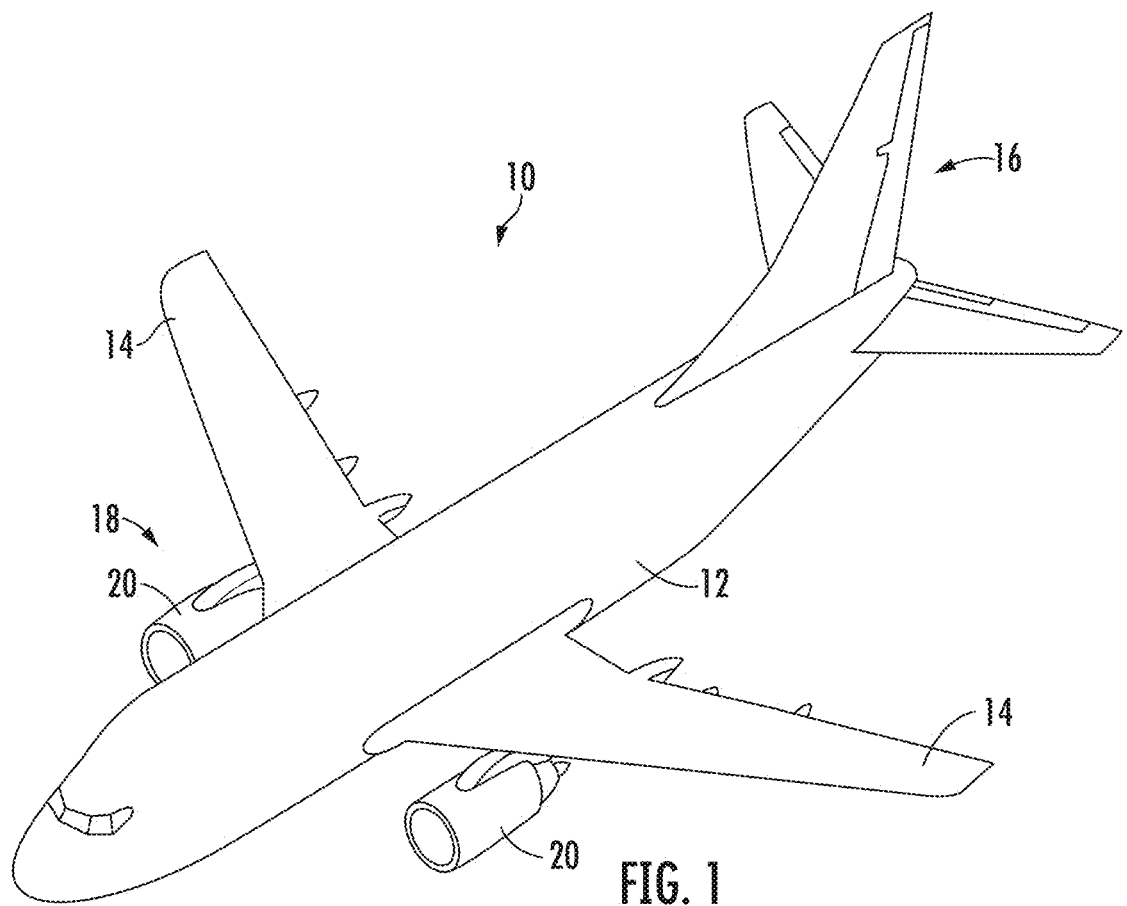
FIG. 1 is a perspective view of an exemplary aircraft in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations.

As used herein, the terms "first," "second," and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, regarding a gas turbine engine, forward refers to a position closer to an engine inlet section and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The present disclosure is generally related to a variable area turbine nozzle assembly for a gas turbine engine. The variable area turbine nozzle assembly generally includes a plurality of guide vanes. An outer centering pin extends radially outward from each respective guide vane with respect to an axial centerline of the variable area turbine nozzle assembly. An inner support ring is spaced radially outward from the guide vanes and defines an opening. The outer centering pin extends through and is rotatable within the opening. In exemplary embodiments, the guide vane includes an inner centering pin. The inner support ring has a coefficient of thermal expansion.

An outer support ring extends circumferentially around the inner support ring and defines an aperture. The outer support ring has a coefficient of thermal expansion that is less than the coefficient of thermal expansion of the inner support ring. The outer centering pin extends at least partially through and is rotatable within the aperture. At least one linkage joins the inner support ring to the outer support ring.

The variable area turbine nozzle assembly uses differential radial growth of the inner support ring and the outer support ring to control a turning angle formed by a trailing edge portion of each guide vane. The trailing edge portion of each guide vane can swing tangentially about the inner and outer centering pins. For example, as combustion gas temperatures T3 and T4 increase, the inner support ring radially outgrows the outer support ring. The linkages cause a circumferential rotation of the inner support ring with respect to the outer support ring. A mechanical interface defined between the outer centering pin and the inner support ring engage to force the trailing edge section of the guide vane to swing more closed (or open if desired) tangentially.

Referring now to the drawings, wherein identical numerals indicate the same elements throughout the figures, FIG. 1 is a perspective view of an aircraft 10 that may incorporate at least one exemplary embodiment of the present disclosure. As shown in FIG. 1, the aircraft 10 has a fuselage 12, wings 14 attached to the fuselage 12, and an empennage 16. The aircraft 10 further includes a propulsion system 18 that produces a propulsive thrust to propel the aircraft 10 in flight, during taxiing operations, etc. Although the propulsion system 18 is shown attached to the wings 14, in other embodiments it may additionally or alternatively include one or more aspects coupled to other parts of the aircraft 10, such as, for example, the empennage 16, the fuselage 12, or both.

The propulsion system 18 includes at least one turbomachine. In the exemplary embodiment shown, aircraft 10 includes a pair of gas turbine engines. Each gas turbine engine 20 is mounted to aircraft 10 in an under-wing configuration. Each gas turbine engine 20 is capable of selectively generating propulsive thrust for the aircraft 10. The gas turbine engine 20 may be configured to burn various forms of fuel including, but not limited to unless otherwise provided, jet fuel/aviation turbine fuel, and hydrogen fuel.

Figure 2:
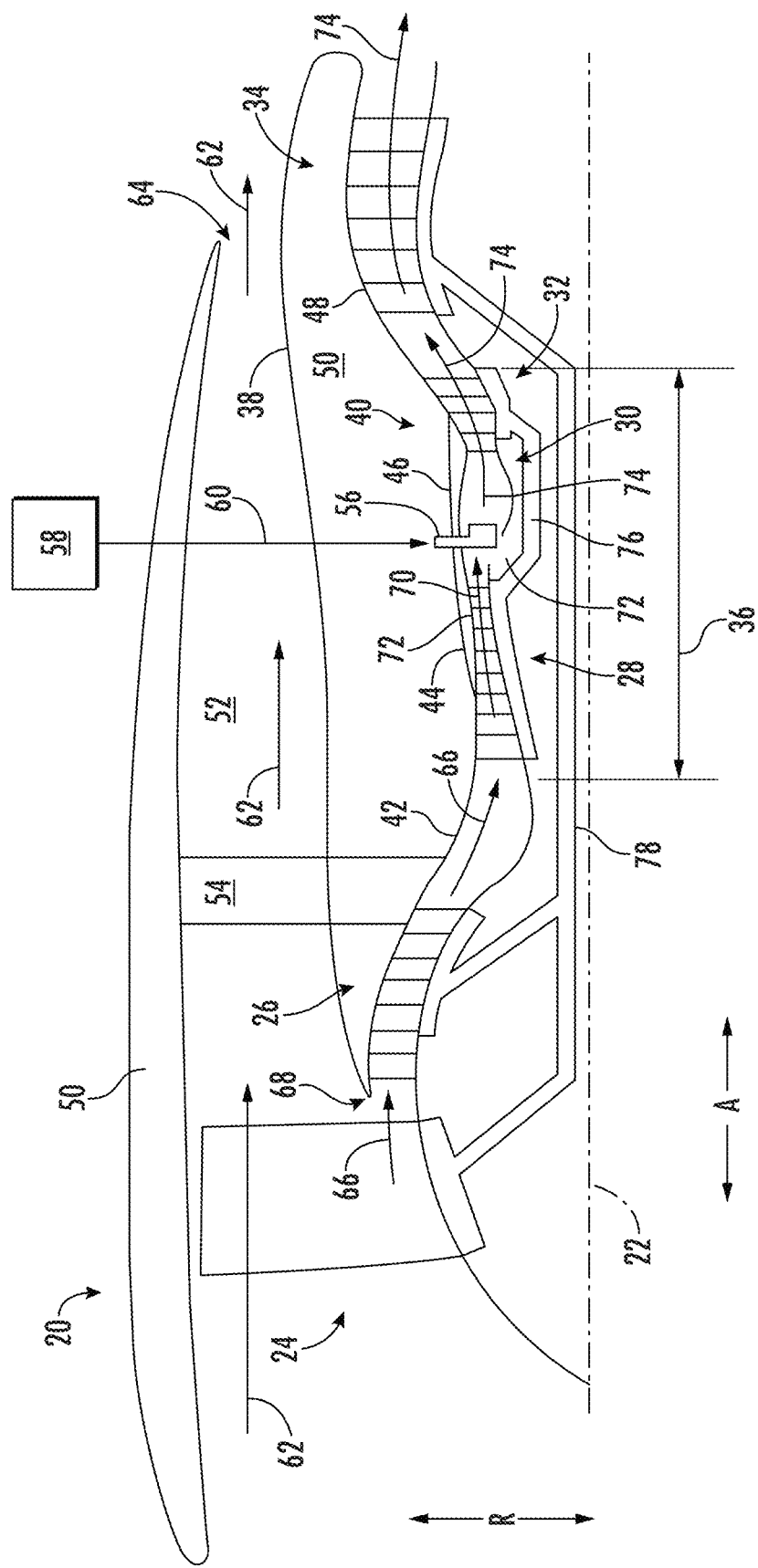
FIG. 2 is a cross-sectional schematic view of a gas turbine engine in accordance with an exemplary aspect of the present disclosure.

FIG. 2 depicts an exemplary gas turbine engine 20 defining an axial direction A (and centerline axis 22) and a radial direction R. While the illustrated example shown is a high-bypass turbofan engine, the principles of the present disclosure are also applicable to other types of engines, such as low-bypass turbofans, turbojets, turboprops, unducted fan engines or open rotor engines, etc., as well as turbine engines having any number of compressor-turbine spools.

The gas turbine engine 20 includes a fan 24, a low-pressure compressor 26 or "booster", a high-pressure compressor 28, a combustor 30, a high-pressure turbine 32, and a low-pressure turbine 34, arranged in serial flow relationship. Collectively, the fan 24, the low-pressure compressor 26, and the low-pressure turbine 34 define a low-pressure system or low-pressure spool of the gas turbine engine 20. Collectively, the high-pressure compressor 28 and the high-pressure turbine 32 define a high-pressure spool of the gas turbine engine 20.

The high-pressure spool and combustor 30 may be referred to as a core engine 36 of the gas turbine engine 20. The core engine 36 is at least partially enclosed within a core cowl 38. The core cowl 38 may also at least partially enclose the low-pressure compressor 26 and the low-pressure turbine 34. An engine casing 40 encases the core engine 36. The engine casing 40 may include one or more of a compressor casing 42, a compressor discharge casing 44, a combustor casing 46, and a turbine casing 48.

A nacelle 50 surrounds at least a portion of the core engine 36, the core cowl 38, and the fan 24. The nacelle 50 and the core cowl 38 form a bypass flow passage 52 therebetween. The nacelle 50 may be supported by one or more struts 54 that extend radially outward from an engine frame (not shown) to the nacelle 50. A plurality of fuel injectors 56 (one fuel injector shown) is mounted to the engine casing 40, more particularly, to the combustor casing 46. A fuel supply system 58 is fluidly coupled to and in fluid communication with the plurality of fuel injectors 56 to provide a flow of a fuel 60 to the plurality of fuel injectors 56, such as, for example, a flow of hydrocarbon fuel.

In operation, fan 24 draws a first portion of air 62 into the bypass flow passage 52. The first portion of air 62 is routed through the bypass flow passage 52 and out a bypass exhaust outlet 64 to provide primary thrust for the gas turbine engine 20. A second portion of air 66 from fan 24 is drawn or routed into an inlet 68 of the low-pressure compressor 26 and is pressurized. The second portion of air 66 is further pressurized as it flows from the low-pressure compressor 26 and through the high-pressure compressor 28 to provide a high-pressure air 70 to a compressor discharge plenum 72 at least partially defined by the engine casing 40.

The high-pressure air 70 flows from the compressor discharge plenum 72 into the combustor 30 where it is mixed with fuel 60 via fuel injector 56 and ignited, thereby generating combustion gases 74. Work is extracted from the combustion gases 74 by the high-pressure turbine 32 which drives the high-pressure compressor 28 via a high-pressure shaft 76. Combustion gases 74 then flow into the low-pressure turbine 34, which drives the fan 24 and the low-pressure compressor 26 via a low-pressure shaft 78.

Figure 3:
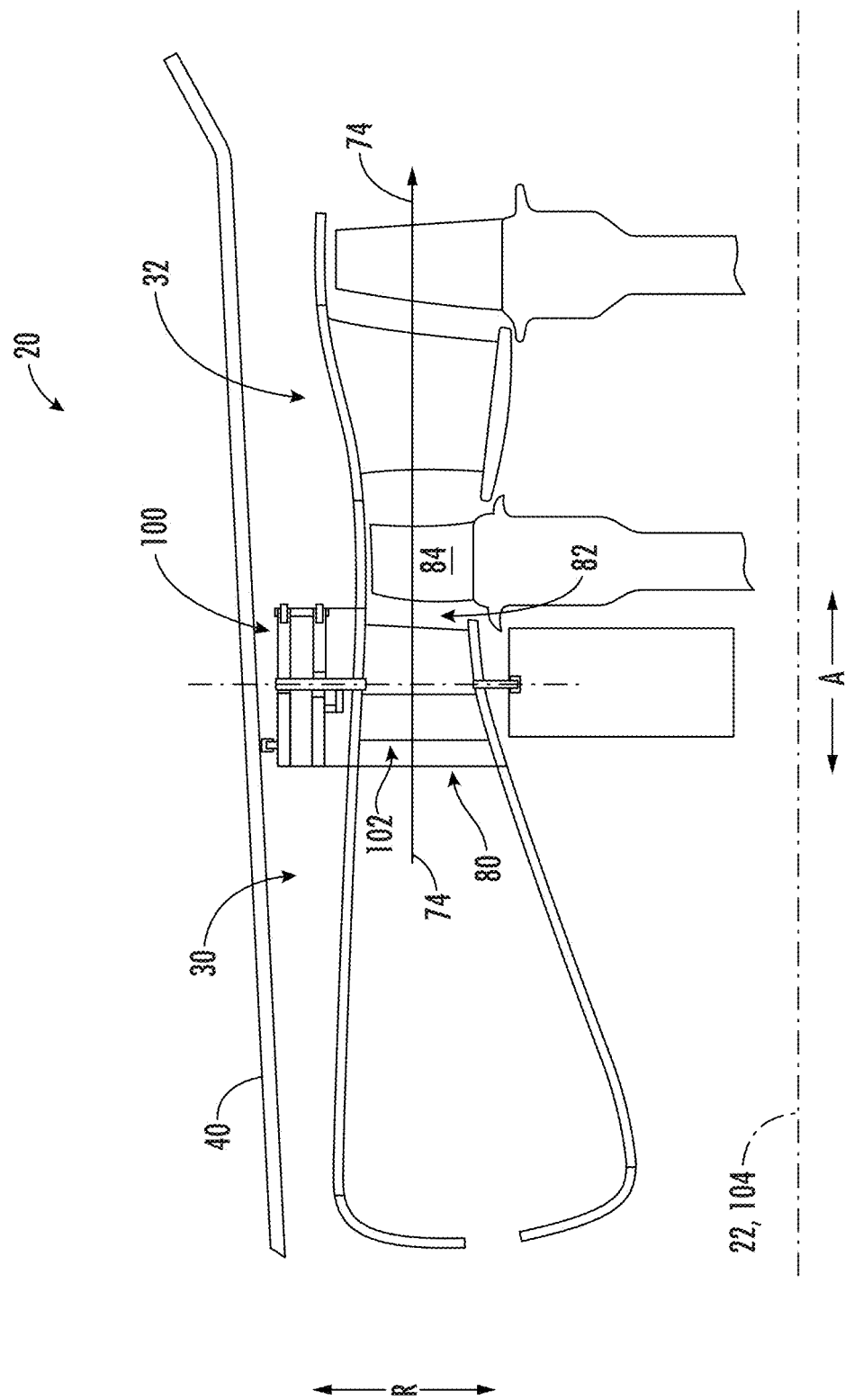
FIG. 3 is a cross-sectional schematic view of a portion of the gas turbine engine shown in FIG. 2 including a variable area turbine nozzle assembly, according to an exemplary embodiment of the present disclosure.

FIG. 3 provides a schematic view of a portion of the gas turbine engine 20 including the combustor 30, a portion of the high-pressure turbine 32, and a portion of the engine casing 40 as depicted in FIG. 2, according to exemplary embodiments of the present disclosure. As shown in FIG. 3, gas turbine engine 20 includes a variable area turbine nozzle assembly 100. In the exemplary embodiment shown, the variable area turbine nozzle assembly 100 is positioned between an outlet 80 of the combustor 30 and an inlet 82 of the high-pressure turbine 32. In operation, the combustion gases 74 flow across guide vanes 102 of the variable area turbine nozzle assembly 100. The guide vanes 102 are shaped to focus and impart swirl about an axial centerline 104 of the variable area turbine nozzle assembly 100 to the combustion gases 74 upstream of a first row of turbine rotor blades 84 (one shown in FIG. 3). It is to be appreciated that although only one guide vane 102 is shown, the variable area turbine nozzle assembly 100 includes a plurality of guide vanes 102 arranged circumferentially about the axial centerline 104 of the variable area turbine nozzle assembly 100. In particular embodiments, the axial centerline 104 of the variable area turbine nozzle assembly 100 may be coaxially aligned with the centerline axis 22 of the gas turbine engine 20.

Figure 4:
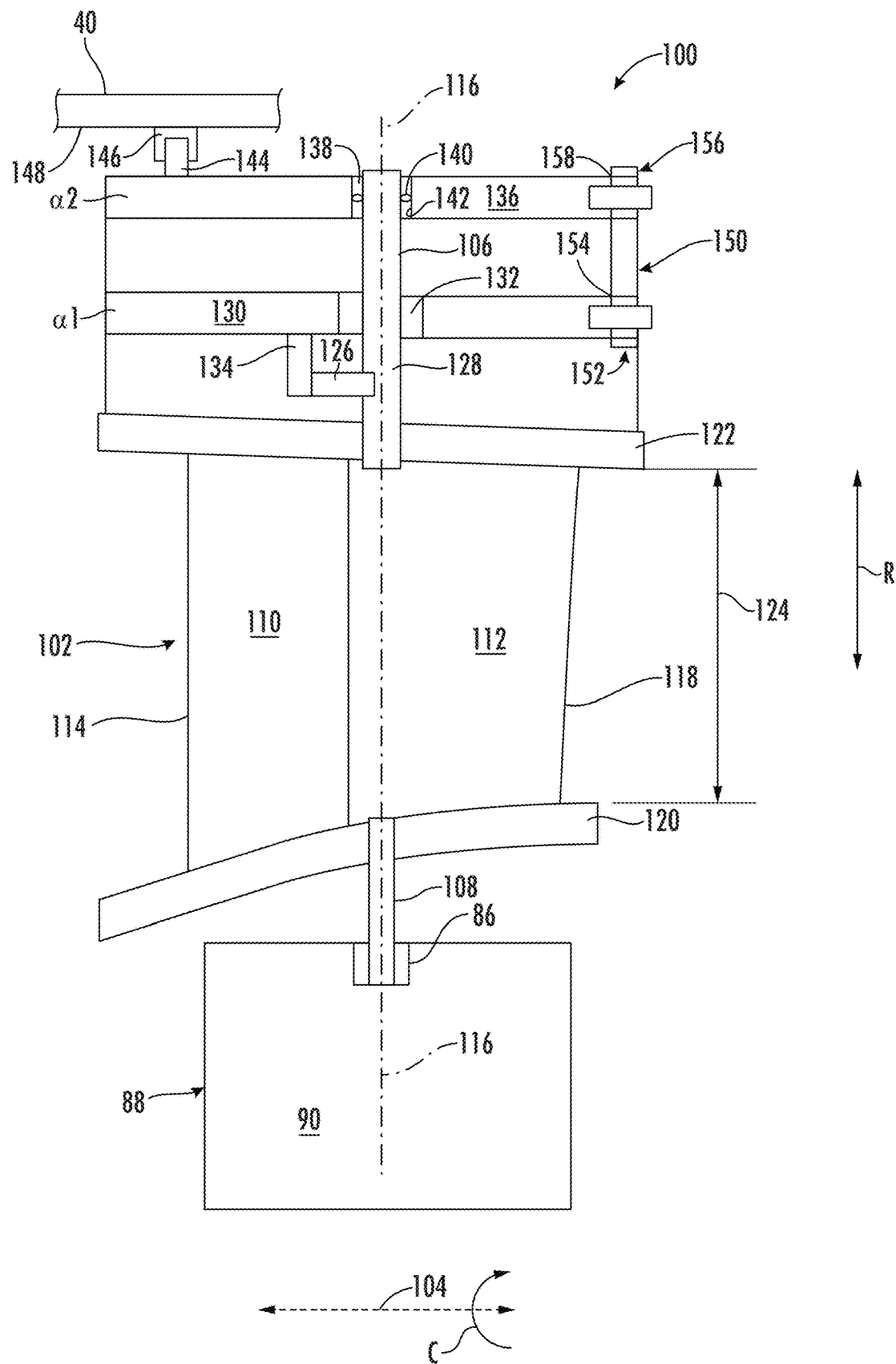
FIG. 4 is an enlarged cross-sectional schematic view of a portion of the gas turbine engine as shown in FIG. 3, according to an exemplary embodiment of the present disclosure.

FIG. 4 provides an enlarged view of the variable area turbine nozzle assembly 100 as shown in FIG. 3, according to exemplary embodiments of the present disclosure. As shown in FIG. 4, guide vane 102 includes an outer centering pin 106 extending radially outward from the guide vane 102 in radial direction (R) with respect to the axial centerline 104 of the variable area turbine nozzle assembly 100. In particular embodiments the guide vane 102 further includes an inner centering pin 108 extending radially inward from the guide vane 102 in radial direction (R) with respect to axial centerline 104 of the variable area turbine nozzle assembly 100. It is to be appreciated that the outer centering pin 106 and the inner centering pin 108 may be formed as a continuous pin that extends radially through the guide vane 102.

Figure 5:
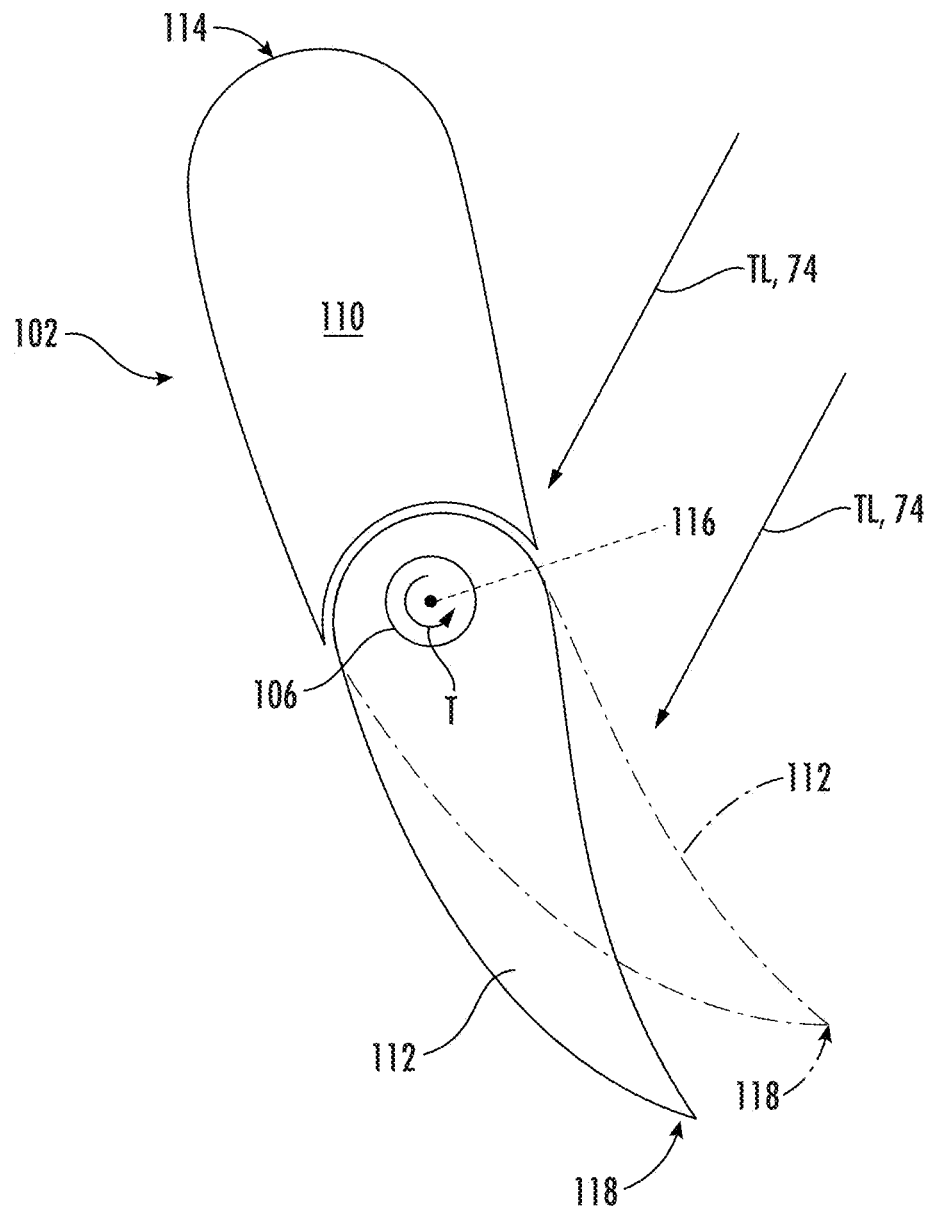
FIG. 5 is a top view of an exemplary guide vane as may be integrated into the variable area turbine nozzle assembly as shown in FIGS. 3 and 4, according to an exemplary embodiment of the present disclosure.

FIG. 5 provides a top view of guide vane 102 according to exemplary embodiments of the present disclosure. As shown in FIGS. 4 and 5 collectively, guide vane 102 generally includes a forward portion 110 and an aft portion 112. The forward portion 110 is stationary or non-rotatable and at least partially defines a leading edge 114 of the guide vane 102. In contrast, the aft portion 112 is rotatable about a radial centerline 116 or pitch point of one or more of the outer centering pin 106 and the inner centering pin 108. The aft portion 112 at least partially defines a trailing edge 118 of the guide vane 102.

Referring to FIG. 4, in particular embodiments, the guide vane 102 extends radially and axially between an inner shroud 120 and an outer shroud 122. In exemplary embodiments, the outer centering pin 106 extends through the outer shroud 122. In particular embodiments, the inner centering pin 108 extends through the inner shroud 120. The inner centering pin 108 may be formed or configured to seat in a slot or hole 86 defined in a mounting structure 88 such as but not limited to a forward inner nozzle support 90. The inner centering pin 108 is rotatable within the slot or hole 86. The inner shroud 120 and the outer shroud 122 define a hot-gas path 124 therebetween. In exemplary embodiments, the outer centering pin 106 includes a tab 126 that is defined by or disposed along an outer surface 128 of the outer centering pin 106. In an exemplary embodiment, tab 126 may be cam shaped.

In the exemplary embodiment shown in FIG. 4, the variable area turbine nozzle assembly 100 includes an inner support ring 130 spaced radially outward from guide vane 102 with respect to radial direction R, and more particularly, radially spaced from the outer shroud 122. In exemplary embodiments, the inner support ring 130 is formed from a metal alloy, such as but not limited to, a Nickle (Ni) or Cobalt (Co) based metal alloy. The inner support ring 130 has a first coefficient of thermal expansion ($\alpha 1$).

The inner support ring 130 defines an opening 132 through which the outer centering pin 106 extends. The outer centering pin 106 is rotatable within the opening 132. The opening 132 is larger (e.g., has a larger diameter) than the outer centering pin 106, thus allowing for relative circumferential movement in a circumferential direction (C) between the inner support ring 130 and the outer centering pin 106. The inner support ring 130 includes or defines a protrusion 134 that is configured, shaped, formed, or otherwise provided to engage with the tab 126 of the outer centering pin 106.

In the exemplary embodiment shown in FIG. 4, the variable area turbine nozzle assembly 100 includes an outer support ring 136 spaced radially outward from guide vane 102 with respect to radial direction R and more particularly, radially spaced outward from the inner support ring 130 such that the outer support ring 136 extends circumferentially around the inner support ring 130. In exemplary embodiments, the outer support ring 136 is formed from a ceramic matrix composite material. The outer support ring 136 has a coefficient of thermal expansion ($\alpha 2$) which is less than the coefficient of thermal expansion ($\alpha 1$) of the inner support ring 130.

The outer support ring 136 coefficient of thermal expansion $\alpha 2$ and the relatively higher inner support ring 130 coefficient of thermal expansion $\alpha 1$ define an alpha ratio ($\alpha_R$). More particularly, the alpha ratio $\alpha_R$ may be described by the following equation:

$$\alpha_R = \alpha 1 / \alpha 2$$

In exemplary embodiments, the alpha ratio $\alpha r$ may be in the range of $0.10 \leq \alpha_R \leq 0.40$. In other embodiments, the alpha ratio may be in the range of $0.16 \leq \alpha_R \leq 0.2$.

The outer support ring 136 defines an aperture 138 through which the outer centering pin 106 extends. In exemplary embodiments, the outer centering pin 106 is rotatable within the aperture 138. It is to be appreciated that aperture 138 may include a bearing assembly 140 disposed along an inner surface 142 of the aperture 138. In this configuration, the outer centering pin 106 may be coupled to the outer support ring 136 but still be rotatable within aperture 138.

In exemplary embodiments, the outer support ring 136 includes or defines an anti-rotation tab 144 that is configured, shaped, formed, or otherwise provided to engage with a casing tab 146 defined along an inner surface 148 of the engine casing 40. In operation, the anti-rotation tab 144 and the casing tab 146 engage to prevent rotation of the outer support ring 136 in circumferential direction C about the axial centerline 104 of the variable area turbine nozzle assembly 100 as the outer support ring 136 heats up during operation of the gas turbine engine 20.

Figure 6:
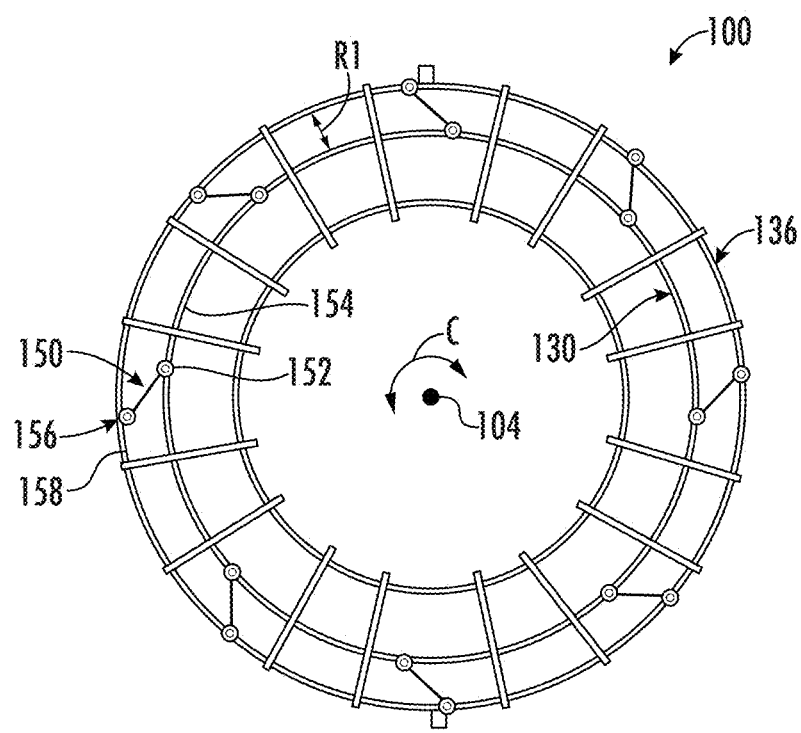
FIG. 6 is an aft-looking-forward view of the variable area turbine nozzle assembly in a first thermal state, according to exemplary embodiments of the present disclosure.
Figure 7:
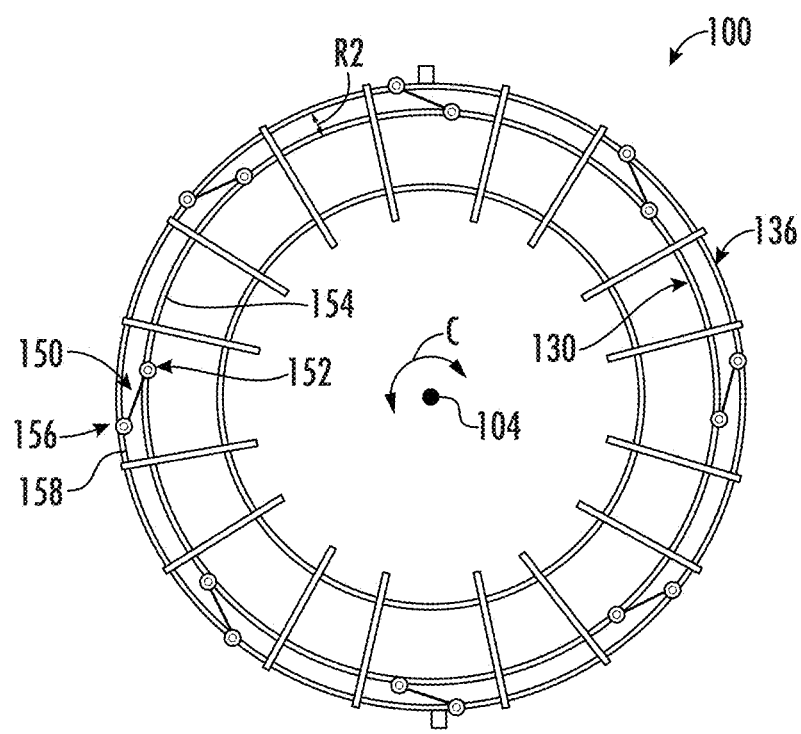
FIG. 7 is an aft-looking-forward view of the variable area turbine nozzle assembly in a second thermal state, according to exemplary embodiments of the present disclosure.

FIG. 6 provides an aft-looking-forward schematic view of the variable area turbine nozzle assembly 100 in a first thermal state, according to exemplary embodiments of the present disclosure. FIG. 7 provides an aft-looking-forward schematic view of the variable area turbine nozzle assembly 100, as shown in FIG. 6, in a second thermal state, according to exemplary embodiments of the present disclosure. As shown in FIGS. 4, 6, and 7 collectively, the variable area turbine nozzle assembly 100 includes a plurality of linkages 150 (e.g. at least one linkage shown in FIG. 4). Each respective linkage 150 is connected at a first end 152 of the respective linkage 150 to a sidewall 154 of the inner support ring 130 and at a second end 156 of the respective linkage 150 to a sidewall 158 of the outer support ring 136. As shown in FIGS. 6-7, the plurality of linkages 150 is spaced circumferentially with respect to circumferential direction C, about the axial centerline 104 of the variable area turbine nozzle assembly 100.

In operation, as shown in FIG. 5, a tangential load (TL) is asserted onto the guide vane 102, particularly the aft portion 112, by combustion gases 74 flowing from the outlet 80 of the combustor 30. Referring to FIGS. 3-7 collectively, the outer support ring 136 holds the outer centering pin 106 in the aperture 138 and transfers torque (T) created by the tangential load TL to the engine casing 40 via the anti-rotation tab 144 and the casing tab 146 defined along the inner surface 148 of the engine casing 40. The inner centering pin 108 may transfer some of the torque T to the forward inner nozzle support 90.

In the first thermal condition, as shown in FIG. 6, the inner support ring 130 and the outer support ring 136 are radially spaced at a first radial distance (R1). As the temperature of the combustion gases 74 flowing from the outlet 80 of the combustor 30 (e.g., temperature T3) or the combustion gases 74 flowing to the inlet 82 of the high-pressure turbine (e.g., temperature T4) increase due to various engine operating conditions, the outer support ring 136 and the inner support ring 130 will each grow radially outward in radial direction R, as shown in FIG. 7. However, because the coefficient of thermal expansion $\alpha 1$ is greater for the inner support ring 130 than the coefficient of thermal expansion α2 of the inner support ring 130, the radial distance R1 will decrease to a second radial distance (R2).

The linkage 150 will cause the inner support ring 130 to rotate in circumferential direction C with respect to the centerline axis 22 and the axial centerline 104 of the variable area turbine nozzle assembly 100 opposite to the direction of the torque T. As a result, the protrusion 134 of the inner support ring 130 engages with and provides a force to the tab 126 extending from the outer centering pin 106 causing the outer centering pin 106 and the aft portion 112, particularly the trailing edge 118 of the guide vane 102, to rotate about the radial centerline 116 of the outer centering pin 106. Rotation of the aft portion 112 of guide vane 102 changes a turbine nozzle throat area defined between two circumferentially adjacent guide vanes. For example, at higher operating temperatures, the turbine nozzle throat area may be decreased when compared to the turbine nozzle throat area at relatively lower operating temperatures.

Figure 8:
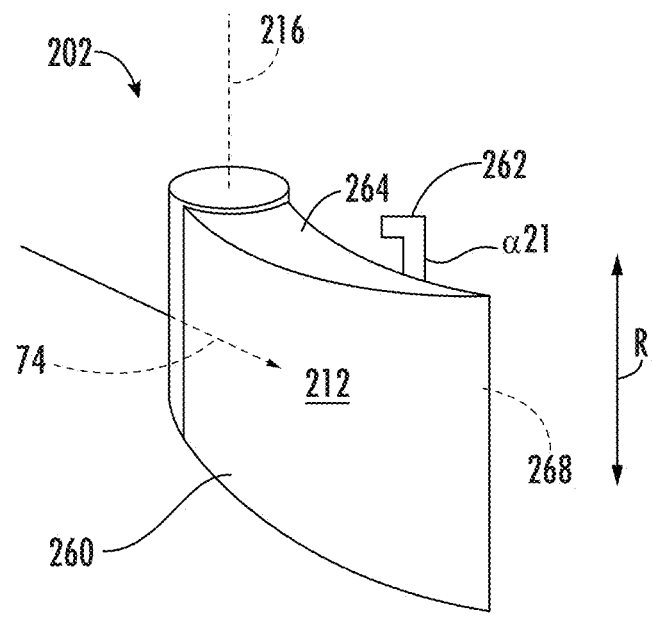
FIG. 8 is a perspective view of a second portion of an exemplary guide vane according to an exemplary embodiment of the present disclosure.
Figure 9:
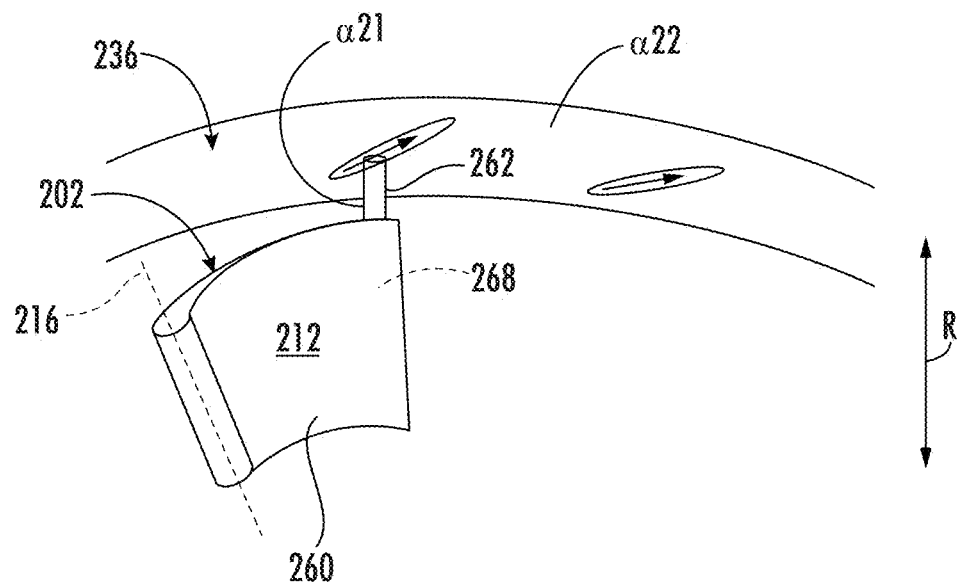
FIG. 9 is a schematic view of an exemplary outer support ring and the exemplary guide vane as shown in FIG. 8, according to an exemplary embodiment of the present disclosure.

FIG. 8 provides a perspective view of a second portion 212 of an exemplary guide vane 202 according to an exemplary embodiment of the present disclosure. FIG. 9 provides a schematic view of an exemplary outer support ring 236 and the exemplary guide vane 202 as shown in FIG. 8, according to an exemplary embodiment of the present disclosure. As shown in FIGS. 8 and 9 collectively, guide vane 202, particularly the second portion 212 of the guide vane 202 includes an airfoil 260 and an extension 262 extending at least partially along the radial direction R at an outer end 264 of the airfoil 260. The extension 262 has a first coefficient of thermal expansion (α21). The airfoil 260 defines a pitch axis 216 and the guide vane 202 defines a flowpath surface 268 configured to be exposed to the flow of combustion gases 74 during operation. As shown in FIG. 9, outer support ring 236 is spaced radially outward from the airfoil 260 of the guide vane 202 with respect to radial direction R. The outer support ring 236 defines a second coefficient of thermal expansion (α22) that is less than the first coefficient of thermal expansion (α21). The extension 262 is operably engaged with the outer support ring 236 to adjust an angle of the airfoil 260 about the pitch axis 216 in response to a change in an operational temperature of the flow of the combustion gases 74. In exemplary embodiments, the alpha ratio $\alpha_R$ between the first coefficient of thermal expansion (α31) of the mounting structure 388 and the second coefficient of thermal expansion (α32) of the outer support ring 336 may be in the range of $0.10 \leq \alpha_R \leq 0.40$. In other embodiments, the alpha ratio may be in the range of $0.16 \leq \alpha_R \leq 0.2$.

Figure 10:
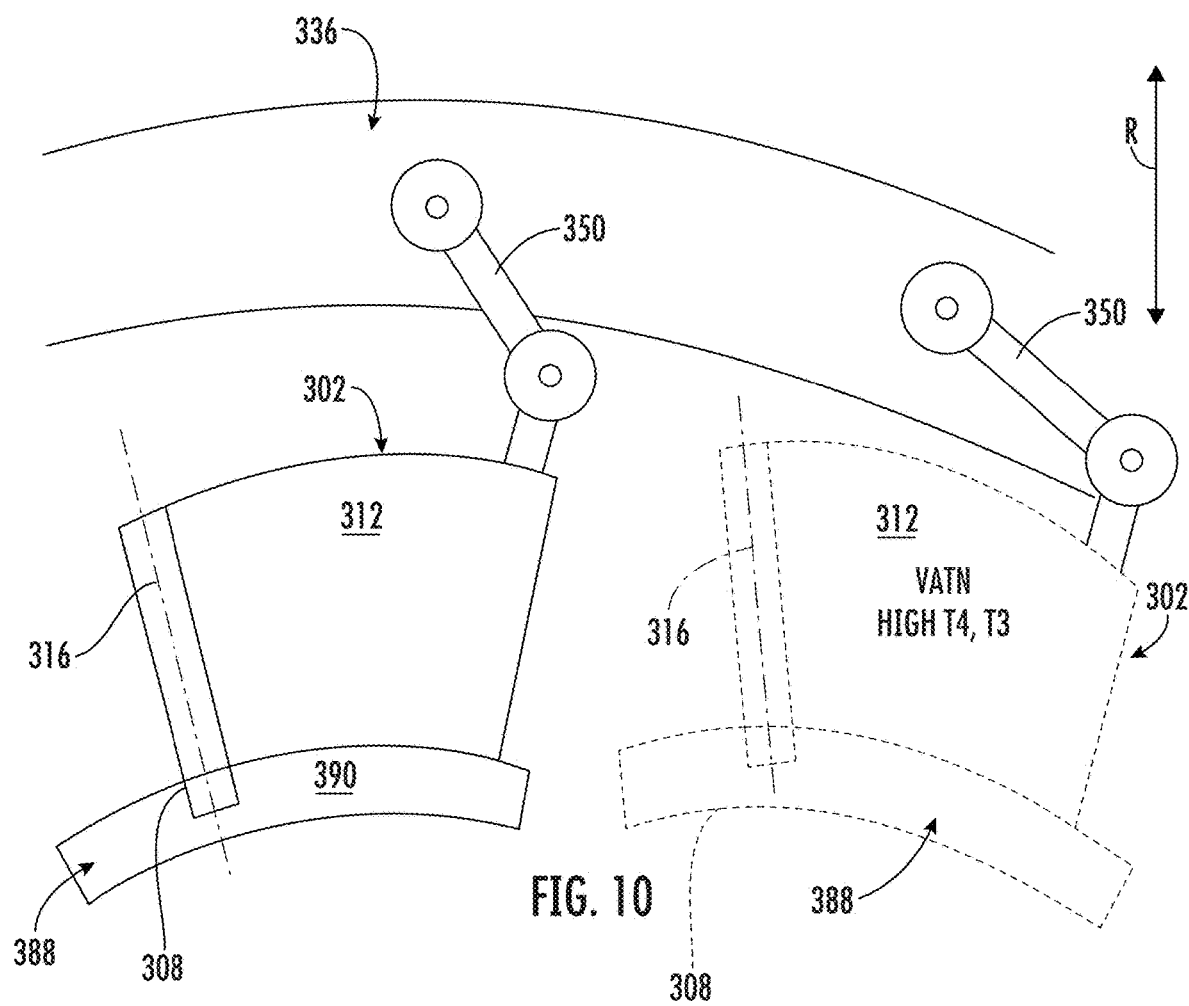
FIG. 10 is a schematic view of an exemplary outer support ring and an exemplary guide vane, according to an exemplary embodiment of the present disclosure.

FIG. 10 is a schematic view of an exemplary outer support ring 336, a second portion 312 of an exemplary guide vane 302, and an exemplary mounting structure 388 such as, but not limited to, a forward inner nozzle support 390, according to an exemplary embodiment of the present disclosure. As shown, the guide vane 302 is mechanically coupled to the outer support ring 336 via a linkage 350. An inner centering pin 308 extends into or is otherwise in contact with the mounting structure 388. The second portion 312 is rotatable about radial centerline 316 or pitch point of the inner centering pin 308.

In the embodiment shown, the mounting structure 388 has a first coefficient of thermal expansion (α31) and the outer support ring 336 has a second coefficient of thermal expansion (α32) that is less than the first coefficient of thermal expansion (α31). In exemplary embodiments, an alpha ratio αr between the first coefficient of thermal expansion (α31) of the mounting structure 388 and the second coefficient of thermal expansion (α32) of the outer support ring 336 may be in the range of $0.10 \leq \alpha_R \leq 0.40$. In other embodiments, the alpha ratio may be in the range of $0.16 \leq \alpha_R \leq 0.2$.

In operation, as shown in dashed lines, the mounting structure 388 will grow radially outwardly with respect to radial direction R as the temperature of the core engine 36 (FIG. 2) increases. The mounting structure 388 will grow more in the radial direction R than the outer support ring 336 due to the lower second coefficient of thermal expansion α32 of the outer support ring 336, thus moving the guide vane 302 towards the outer support ring 336. The linkage 350 forces the guide vane 302, particularly the second portion 312 of the guide vane 302, to rotate about radial centerline 316.

Further aspects are provided by the subject matter of the following clauses:

A variable area turbine nozzle assembly, comprising: a guide vane including an outer centering pin extending radially outward from the guide vane with respect to an axial centerline of the variable area turbine nozzle assembly; an inner support ring spaced radially outward from the guide vane, the inner support ring defining an opening and having a first coefficient of thermal expansion, wherein the outer centering pin extends through and is rotatable within the opening; an outer support ring extending circumferentially around the inner support ring and defining an aperture, the outer support ring having a second coefficient of thermal expansion, wherein the second coefficient of thermal expansion is greater than or less than the first coefficient of thermal expansion, wherein the outer centering pin extends at least partially through and is rotatable within the aperture; and at least one linkage joining the inner support ring to the outer support ring, wherein the at least one linkage is configured to rotate the guide vane about a centerline of the outer centering pin in response to a change in operational temperature of a combustion gas.

The variable area turbine nozzle assembly of any preceding or proceeding clause, wherein the outer centering pin comprises a tab, wherein the tab is engaged with an end portion of the at least one linkage.

The variable area turbine nozzle assembly of any preceding or proceeding clause, wherein the tab is cam shaped.

The variable area turbine nozzle assembly of any preceding or proceeding clause, wherein the outer support ring defines an outer surface and a protrusion extending radially outward from the outer surface.

The variable area turbine nozzle assembly of any preceding or proceeding clause, wherein the protrusion is configured to prevent rotation of the outer support ring about the axial centerline of the variable area turbine nozzle assembly.

The variable area turbine nozzle assembly of any preceding or proceeding clause, further comprising an inner shroud radially spaced from an outer shroud, wherein the inner shroud and the outer shroud define a flowpath therebetween, and wherein the guide vane is disposed between the inner shroud and the outer shroud within the flowpath.

The variable area turbine nozzle assembly of any preceding or proceeding clause, wherein the inner support ring defines a first sidewall and the outer support ring defines a second sidewall, wherein the linkage is coupled to the first sidewall and the second sidewall.

The variable area turbine nozzle assembly of any preceding or proceeding clause, wherein the guide vane further comprises an inner centering pin extending radially inward from the guide vane with respect to the axial centerline of the variable area turbine nozzle assembly.

The variable area turbine nozzle assembly of any preceding or proceeding clause, wherein the at least one linkage is one linkage of a plurality of linkages joining the inner support ring to the outer support ring.

The variable area turbine nozzle assembly of any preceding or proceeding clause, wherein the plurality of linkages are circumferentially arranged about the axial centerline of the variable area turbine nozzle assembly.

A gas turbine engine, comprising: a combustion section including a combustor; a turbine section disposed downstream from the combustion section, the turbine section including a engine casing defining an inner surface and a variable area turbine nozzle assembly disposed within the engine casing, the variable area turbine nozzle assembly comprising: a guide vane including an outer centering pin extending radially outward from the guide vane with respect to an axial centerline of the variable area turbine nozzle assembly; an inner support ring spaced radially outward from the guide vane, the inner support ring defining an opening and having a first coefficient of thermal expansion, wherein the outer centering pin extends through and is rotatable within the opening; an outer support ring extending circumferentially around the inner support ring and defining an aperture, the outer support ring having a second coefficient of thermal expansion, wherein the second coefficient of thermal expansion is greater than or less than the first coefficient of the thermal expansion, wherein the outer centering pin extends at least partially through and is rotatable within the aperture; and at least one linkage joining the inner support ring to the outer support ring, wherein the at least one linkage is configured to rotate the guide vane about a centerline of the outer centering pin in response to a change in operational temperature of a combustion gas.

The gas turbine engine of any preceding or proceeding clause, wherein the outer centering pin comprises a tab, wherein the tab is engaged with an end portion of the linkage.

The gas turbine engine of any preceding or proceeding clause, wherein the tab is cam shaped.

The gas turbine engine of any preceding or proceeding clause, wherein the outer support ring defines an outer surface and a protrusion extending radially outward from the outer surface.

The gas turbine engine of any preceding or proceeding clause, wherein the engine casing defines an anti-clocking tab disposed along the inner surface, wherein the anti-clocking tab is engaged with the protrusion, wherein the anti-clocking tab and the protrusion are configured to prevent rotation of the outer support ring about the axial centerline of the variable area turbine nozzle assembly.

The gas turbine engine of any preceding or proceeding clause, wherein the variable area turbine nozzle assembly further comprises an inner shroud radially spaced from an outer shroud, wherein the inner shroud and the outer shroud define a hot-gas flowpath therebetween, and wherein the guide vane is disposed between the inner shroud and the outer shroud within the hot-gas flowpath.

The gas turbine engine of any preceding or proceeding clause, wherein the inner support ring defines a first sidewall, and the outer support ring defines a second sidewall, wherein the linkage is coupled to the first sidewall and the second sidewall.

The gas turbine engine of any preceding or proceeding clause, wherein the guide vane further comprises an inner centering pin extending radially inward from the guide vane with respect to the axial centerline of the variable area turbine nozzle assembly.

The gas turbine engine of any preceding or proceeding clause, wherein the turbine section includes an inner support, wherein the inner centering pin extends into and is rotatable within the inner support.

The gas turbine engine of any preceding or proceeding clause, wherein the at least one linkage is one linkage of a plurality of linkages joining the inner support ring to the outer support ring, and wherein the plurality of linkages is circumferentially arranged about the axial centerline of the variable area turbine nozzle assembly.

A variable area turbine nozzle assembly defining a radial direction and a circumferential direction, comprising: a guide vane including an airfoil and an extension extending at least partially along the radial direction at an outer end of the airfoil, the extension defining a first coefficient of thermal expansion and the airfoil defining a pitch axis, the guide vane defining a flowpath surface configured to be exposed to a combustion gas flow at an operational temperature; and an outer support ring spaced radially outward from the airfoil of the guide vane, the outer support ring defining a second coefficient of thermal expansion that is greater than or less than the first coefficient of thermal expansion, wherein the extension is operably engaged with the outer support ring to adjust an angle of the airfoil about the pitch axis in response to a change in operational temperature of a combustion gas.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A variable area turbine nozzle assembly, comprising:
   a guide vane including an outer centering pin, wherein the outer centering pin includes a tab disposed along an outer surface of the outer centering pin;
   an inner support ring spaced radially outward from the guide vane, the inner support ring defining an opening and a protrusion disposed along an inner surface of the inner support ring, wherein the protrusion is configured to engage with the tab of the outer centering pin, wherein the outer centering pin extends through the opening, and wherein the inner support ring has a first coefficient of thermal expansion;
   an outer support ring extending circumferentially around the inner support ring and defining an aperture, wherein the outer centering pin extends at least partially through and is rotatable within the aperture, the outer support ring having a second coefficient of thermal expansion, wherein the second coefficient of thermal expansion is greater than or less than the first coefficient of the thermal expansion; and
   at least one linkage joining the inner support ring to the outer support ring, wherein the at least one linkage is configured to rotate the inner support ring circumferentially about an axial centerline of the variable area turbine nozzle assembly in response to a change in operational temperature of a combustion gas.

2. The variable area turbine nozzle assembly of claim 1, wherein the guide vane includes a first portion defining a leading edge of the guide vane, and a second portion defining a trailing edge of the guide vane.

3. The variable area turbine nozzle assembly of claim 2, wherein the first portion of the guide vane is stationary, and wherein the second portion of the guide vane is coupled to and rotatable with the outer centering pin.

4. The variable area turbine nozzle assembly of claim 1, wherein the outer support ring includes an outer surface and an anti-rotation tab, wherein the anti-rotation tab extends radially outward from the outer surface.

5. The variable area turbine nozzle assembly of claim 4, wherein the anti-rotation tab is configured to prevent rotation of the outer support ring about the axial centerline of the variable area turbine nozzle assembly.

6. The variable area turbine nozzle assembly of claim 1, further comprising an inner shroud radially spaced from an outer shroud, wherein the inner shroud and the outer shroud define a hot-gas path therebetween, and wherein the guide vane is disposed between the inner shroud and the outer shroud within the hot-gas path.

7. The variable area turbine nozzle assembly of claim 1, wherein the inner support ring defines a first sidewall, and the outer support ring defines a second sidewall, wherein the at least one linkage is coupled to the first sidewall and the second sidewall.

8. The variable area turbine nozzle assembly of claim 1, wherein the guide vane further comprises an inner centering pin extending radially inward from the guide vane.

9. The variable area turbine nozzle assembly of claim 1, wherein the at least one linkage comprises a plurality of linkages joining the inner support ring to the outer support ring.

10. The variable area turbine nozzle assembly of claim 9, wherein the plurality of linkages is circumferentially arranged about the axial centerline of the variable area turbine nozzle assembly.

11. A gas turbine engine, comprising:
    a combustor;
    a turbine disposed downstream from the combustion, the turbine including an engine casing defining an inner surface and a variable area turbine nozzle assembly disposed within the engine casing, the variable area turbine nozzle assembly comprising:
        a guide vane including an outer centering pin, wherein the outer centering pin includes a tab disposed along an outer surface of the outer centering pin;
        an inner support ring spaced radially outward from the guide vane, the inner support ring defining an opening and a protrusion disposed along an inner surface of the inner support ring, wherein the protrusion is configured to engage with the tab of the outer centering pin, wherein the outer centering pin extends through the opening, and wherein the inner support ring has a first coefficient of thermal expansion;
        an outer support ring extending circumferentially around the inner support ring and defining an aperture, wherein the outer centering pin extends at least partially through and is rotatable within the aperture, the outer support ring having a second coefficient of thermal expansion, wherein the second coefficient of thermal expansion is greater than or less than the first coefficient of thermal expansion; and
        at least one linkage joining the inner support ring to the outer support ring, wherein the at least one linkage is configured to rotate the inner support ring circumferentially about an axial centerline of the variable area turbine nozzle assembly in response to a change in operational temperature of a combustion gas.

12. The gas turbine engine of claim 11, wherein the guide vane includes a first portion defining a leading edge of the guide vane, and a second portion defining a trailing edge of the guide vane.

13. The gas turbine engine of claim 12, wherein the first portion of the guide vane is stationary, and wherein the second portion of the guide vane is coupled to and rotatable with the outer centering pin.

14. The gas turbine engine of claim 11, wherein the outer support ring includes an outer surface and an anti-rotation tab, wherein the anti-rotation tab extends radially outward from the outer surface.

15. The gas turbine engine of claim 14, wherein the engine casing defines a casing tab defined along an inner surface of the engine casing, wherein the casing tab is engaged with the anti-rotation tab, wherein the casing tab and the anti-rotation tab are configured to prevent circumferential rotation of the outer support ring about the axial centerline of the variable area turbine nozzle assembly.

16. The gas turbine engine of claim 11, wherein the variable area turbine nozzle assembly further comprises an inner shroud radially spaced from an outer shroud, wherein the inner shroud and the outer shroud define a hot-gas flowpath therebetween, and wherein the guide vane is disposed between the inner shroud and the outer shroud within the hot-gas flowpath.

17. The gas turbine engine of claim 11, wherein the inner support ring defines a first sidewall, and the outer support ring defines a second sidewall, wherein the at least one linkage is coupled to the first sidewall and the second sidewall.

18. The gas turbine engine of claim 11, wherein the guide vane further comprises an inner centering pin extending radially inward from the guide vane with respect to the axial centerline of the variable area turbine nozzle assembly.

19. The gas turbine engine of claim 18, wherein the turbine includes a forward inner nozzle support, wherein the inner centering pin extends into and is rotatable within the forward inner nozzle support.

\* \* \* \* \*